Patented July 13, 1937

2,086,871

UNITED STATES PATENT OFFICE 2,086,871

DYESTUFFS OF THE DIOXAZINE SERIES

Georg Kränzlein, Karl Thiess, Heinrich Greune, and Arnold Brunner, Frankfort-on-the-Main, Germany, assignors to General Aniline Works, Inc., New York, N. Y., a corporation of Delaware No Drawing. Application October 30, 1933, Serial No. 695,946. In Germany November 3, 1932

6 Claims. (Cl. 260—28)

The present invention relates to dyestuffs of the oxazine series.

We have found that intensely colored dyestuffs of different shades are obtainable by condensing a di-acylamino-arylamino-quinone of the following formula:

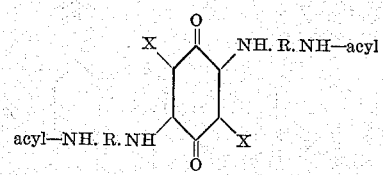

wherein X represents hydrogen, halogen, alkyl or aryl and R means an aromatic radical, whereby ring closure occurs with formation of a product which, in most cases, differs in color from the parent material; if desired, the condensation products thus obtained may be sulfonated. The condensation may be effected as described in German Patents Nos. 253,091 and 253,761 and in U. S. patent application Serial No. 364,316 filed May 18, 1929, in the name of Georg Kränzlein, Heinrich Greune, and Max Thiele, for instance, by heating the starting material advantageously in a high boiling solvent, in the presence or absence of a metal chloride and/or oxidizing agent or, for instance, in the presence of an acylating agent advantageously in a high boiling solvent according to the process of U. S. patent application Serial No. 673,774, filed May 31, 1933, in the name of Karl Thiess. Or the condensation with simultaneous sulfonation may be effected by using concentrated sulfuric acid, fuming sulfuric acid or chlorosulfonic acid as condensing agent as described in U. S. patent application Serial No. 570,254, filed October 21, 1931, in the name of Georg Kränzlein, Heinrich Greune and Franz Brunnträger.

The products obtainable according to the process of the present invention are new. There are obtained, for instance, those of the following general formula:

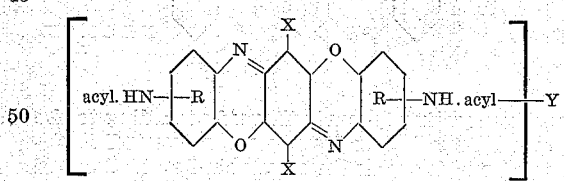

wherein X represents hydrogen, halogen, alkyl, acyl means one of the usual acyl radicals, the nuclei designated by R represent identical aromatic radicals, for instance, of the benzene, diphenyl or carbazol series, the NH-acyl groups occupying identical positions in the nuclei R, and wherein Y means that the compound may be sulfonated.

The unsulfonated products may be used directly as pigment dyes or for coloring caoutchouc and rubber or they may be transformed into water-soluble dyestuffs by sulfonation whereby the acylamino groups (for instance, the acetylamino-, benzoylamino-, toluenesulfamino group) remain unchanged or all or some of them may be saponified. The sulfonic acids may be transformed into insoluble salts which are suitable for being used as pigment dyes.

The following examples serve to illustrate the invention, but they are not intended to limit it thereto, the parts being by weight:

(1) 20 parts of the condensation product obtainable from tetrachloroquinone (chloranil) and monoacetyl-1.4-diamino-benzene of the following formula:

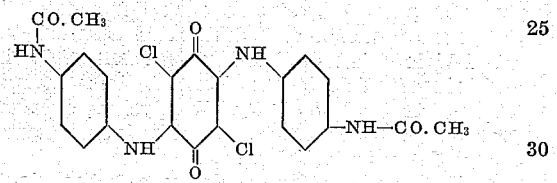

are boiled for 8 hours in 300 parts of nitrobenzene in the presence of 18 parts of benzoylchloride. After cooling, the deeply violet colored reaction mass is filtered by suction and the residue is washed with alcohol and dried. The new dyestuff forms a copper-red powder having a metallic luster and dissolving in concentrated sulfuric acid to a pure blue solution. When this solution is poured on ice, a blue precipitate separates which, on addition of caustic soda solution, turns red-violet. The dyestuff dissolves only very difficultly in hot organic solvents such as chlorobenzene or toluene. The solutions show a beautiful fluorescence. By sulfonating the dyestuff, for instance, in sulfuric acid of 20% of $SO_3$, a water-soluble dyestuff is obtained which dyes cotton from a neutral bath violet tints. The dyeings are distinguished by a good fastness to light.

(2) By replacing the benzoylchloride by 0.5 part of sublimated ferric chloride, the same dyestuff is obtained.

(3) By using in Example 1 instead of the condensation product from chloranil and monoacetyl-1.4-diaminobenzene the condensation product, obtainable from trichlorotoluquinone and the same acetylamino compound, of the following formula:

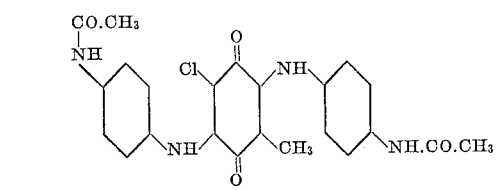

a dyestuff is obtained which is very similar to that described before.

(4) By replacing in Example 1 the starting material used therein by 22 parts of the condensation product, obtainable from chloranil and monobenzoyl-1.4-diaminobenzene, of the following formula:

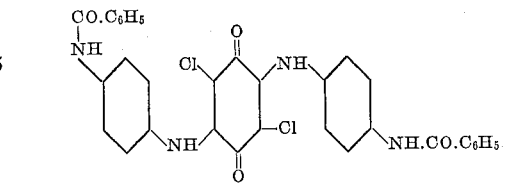

a copper-red powder of a metallic luster is obtained, which dissolves in concentrated sulfuric acid to a greenish-blue solution. When the product is poured on ice, a pure blue precipitate separates which, on addition of alkalies, turns red-violet. By sulfonating it, a sulfonic acid is obtained which dyes cotton red-violet tints of a purer shade than that of the dyeings obtainable according to Example 1. The dyeings have a good fastness to light.

(5) By replacing in Example 1 the starting material used therein by 20 parts of the condensation product obtainable from chloranil and monoacetyl-1.3-diaminobenzene of the following formula:

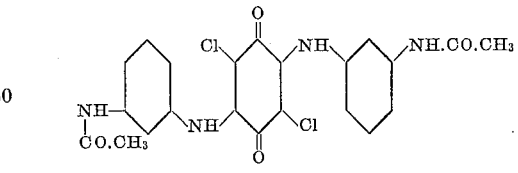

a violet-brown powder of a metallic luster is obtained which dissolves in concentrated sulfuric acid to a blue-green solution. The sulfonic acid prepared therefrom dyes cotton bluish-grey tints.

(6) 20 parts of the condensation product from chloranil and monoacetyl-1.4-diaminobenzene used in Example 1 are boiled for 10 hours in 300 parts of trichlorobenzene in the presence of 6 parts of sodium nitrite and 12 parts of benzotrichloride. The dyestuff is similar to that obtainable according to Example 1.

(7) 20 parts of the condensation product, obtainable from chloranil and monoacetyl-4.4'-diaminodiphenyl, of the following formula:

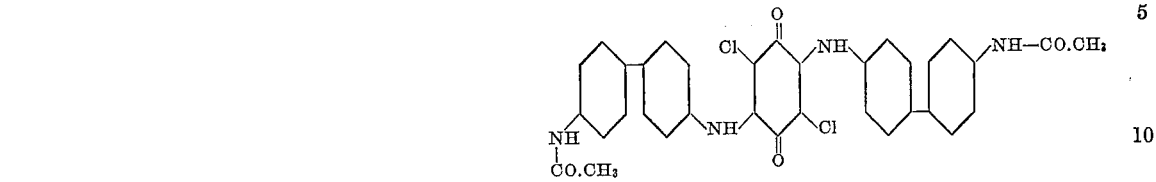

are boiled for 10 hours in 300 parts of nitrobenzene in the presence of 22 parts of benzoylchloride. The dyestuff is worked up as described in Example 1. It forms a dark violet powder which dissolves in concentrated sulfuric acid to a bluish-green solution. The sulfonic acid prepared therefrom dyes cotton beautiful, intensely colored, bluish-violet tints of good fastness to light.

(8) By using in Example 1 instead of the condensation product obtainable from chloranil and monoacetyl-1.4-diaminobenzene that obtainable from monoformyl-1.4-diaminobenzene and chloranil of the following formula:

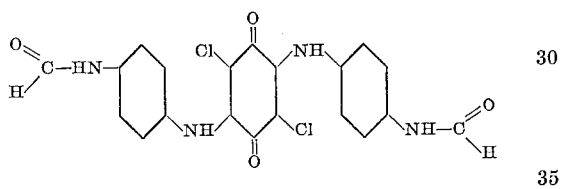

a brownish powder of a metallic luster is obtained which dissolves in concentrated sulfuric acid to a greenish-blue solution. When this solution is poured on ice, a blue precipitate separates which, on addition of caustic soda solution turns violet. The sulfonic acid dyes cotton violet tints.

(9) 24 parts of the condensation product from tetrabromo-quinone and monoacetyl-1.4-diaminobenzene of the following formula:

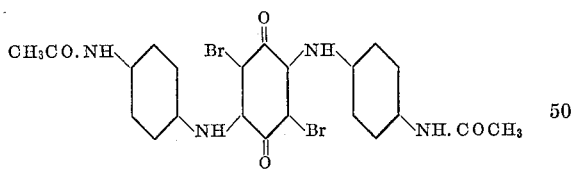

are treated as described in Example 1. The new dyestuff thus obtained is very similar to that described in Example 1.

(10) By using as starting material the condensation product obtainable from quinone and monoacetyl-1.4-diaminobenzene of the following formula:

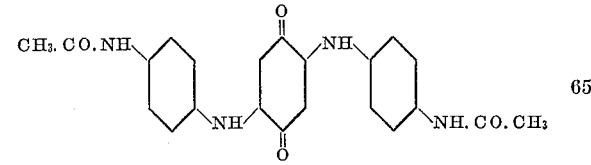

and by treating 18 parts thereof according to the process described in Example 1, a dyestuff is obtained which yields tints very similar to those of the dyestuff obtainable according to Example 1.

(11) 23.5 parts of the condensation product, obtainable from chloranil and 3-amino-6-acetylamino-N-ethylcarbazole, of the following formula:

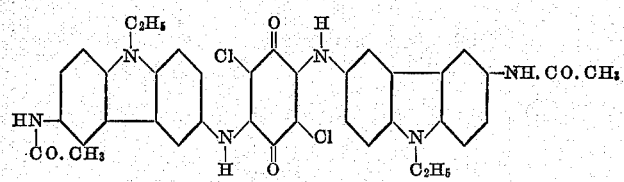

are boiled for some hours under reflux with 400 parts of nitrobenzene and 7 parts of meta-nitrobenzenesulfochloride. The dioxazine which has been precipitated is filtered by suction at about 120° C., washed with hot nitrobenzene and finally with alcohol and dried.

By sulfonating with strong sulfuric acid at elevated temperature the dioxazine thus obtained, a water-soluble sulfonic acid is obtained which dyes cotton, viscose artificial silk and mixed fabrics blue tints of very good fastness to light.

We claim:

1. The product of the formula:

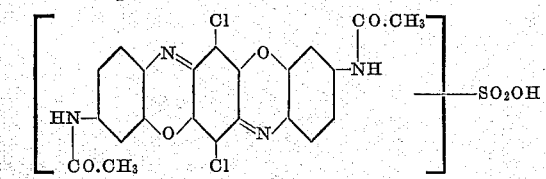

dyeing cotton from a neutral bath violet tints of good fastness to light.

2. The product of the formula:

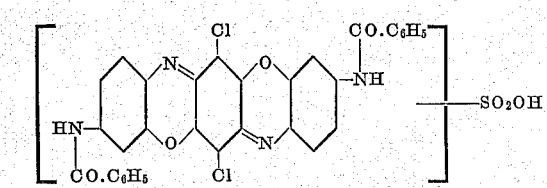

dyeing cotton red-violet tints of good fastness to light.

3. The product of the formula:

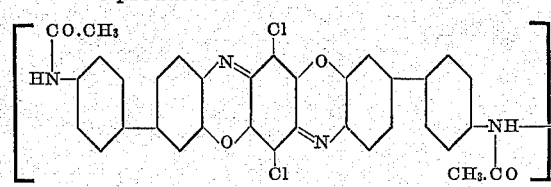

dyeing cotton beautiful, intensely colored blue-voilet tints of good fastness to light.

4. The members selected from the class consisting of compounds of the general formula

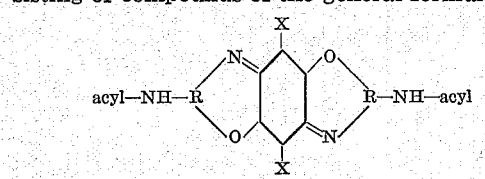

wherein X represents a member of the group consisting of hydrogen, halogen and alkyl, acyl means an acyl radical of the lower fatty acid series and the benzene series, the R's represent identical radicals of the benzene and diphenyl series bound to the central N- and O-atoms in ortho-positions, the NH-acyl groups occupying identical positions in the radicals R, and the sulfonic acids of these compounds.

5. The members selected from the class consisting of compounds of the general formula

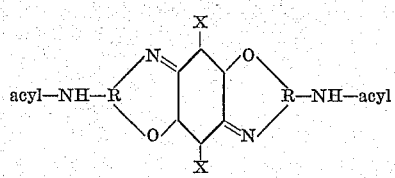

wherein X represents chlorine, acyl means an acyl radical of the lower fatty acid series and the benzene series, the R's represent identical radicals of the benzene and diphenyl series bound to the central N- and O-atoms in ortho-positions, the NH-acyl groups occupying identical positions in the radicals R, and the sulfonic acids of these compounds.

6. The products of the general formula:

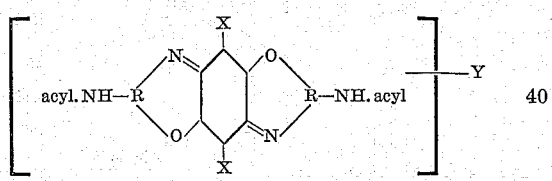

wherein X represents chlorine, the R's represent identical radicals of the benzene and diphenyl series bound to the central N- and O-atoms in ortho-positions, the NH-acyl groups occupying identical positions in the radicals R, in para-position to the central N-atoms, Y means that the compound is sulfonated and acyl means a member of the group consisting of acetyl and benzoyl.

GEORG KRÄNZLEIN.
KARL THIESS.
HEINRICH GREUNE.
ARNOLD BRUNNER.